United States Patent [19]
Burroway et al.

[11] 4,064,092
[45] Dec. 20, 1977

[54] COATING COMPOSITION

[75] Inventors: Gary L. Burroway, Doylestown; Michael J. Maximovich, Akron, both of Ohio

[73] Assignee: The Goodyear Tire & Rubber Company, Akron, Ohio

[21] Appl. No.: 680,818

[22] Filed: Apr. 28, 1976

Related U.S. Application Data

[63] Continuation of Ser. No. 520,829, Nov. 4, 1974, abandoned.

[51] Int. Cl.² .................. C08F 6/14; C08F 220/06; C08F 222/02
[52] U.S. Cl. .................. 260/29.6 PM; 260/29.6 T; 260/29.6 TA; 260/29.6 MN; 260/32.8 R; 260/33.2 R; 526/216; 526/317; 526/328
[58] Field of Search .............. 260/29.6 T, 29.6 TA, 260/29.6 PM, 29.6 MN, 33.2 R, 32.8 R; 526/216, 317

[56] References Cited

U.S. PATENT DOCUMENTS

| | | | |
|---|---|---|---|
| 2,753,318 | 7/1956 | Maeder | 260/29.6 MN |
| 3,106,486 | 10/1963 | Harren et al. | 117/123 |
| 3,980,602 | 9/1976 | Jakubauskas | 260/29.6 TA |

Primary Examiner—John Kight, III
Attorney, Agent, or Firm—F. W. Brunner; H. C. Young, Jr.

[57] ABSTRACT

A water reducible resin composition, a water reducible admixture of such resin with solvents and plasticizers, a water reduced form of such mixture suitable for a coating, and a coating prepared from such water reduced mixture. Said resin is required to be prepared from a balance of hydrophobic enhancing and hydrophilic enhancing monomers. Generally such hydrophobic enhancing monomers are required to be a balance of monomers promoting hard and soft segments of the resin.

7 Claims, No Drawings

COATING COMPOSITION

This is a continuation of application Ser. No. 520,829, filed Nov. 4, 1974, now abandoned.

This invention relates to a particulate, water reducible resin composition, a water reducible admixture of such resin with solvents and plasticizers, a water reduced form of such mixture suitable for a coating, and a coating prepared from such water reduced mixture. This invention particularly relates to such materials utilizing a resin having a major portion derived from a balanced mixture of hydrophobic enhancing monomers and a minor portion derived from hydrophilic enhancing monomers.

Heretofore, various resins have been prepared and used for the purpose of providing various protective coatings. Exemplary of such resins are those prepared by aqueous emulsion polymerizing monomer mixtures of various materials such as minor or medium amounts of monomers such as styrene and methyl methacrylate, and medium or major amounts of monomers such as 2-ethylhexyl acrylate and methacrylic acid. Generally such resins are insoluble in water. Therefore, in general practice, resins prepared from such monomers have either been dissolved in a suitable organic solvent in order to provide a coating solution or have been dispersed in water with the aid of substantial emulsifying or surfactive agents. Such water dispersions, when used to prepare coatings, generally require additional hardeners to overcome residual emulsifiers and curatives to crosslink the resin where water insoluble coatings are desired. Otherwise, such coatings prepared from a water dispersion would simply bleed away with a water wash.

A serious disadvantage of organic solvent solutions is their inherent potential toxicity, flammability and environmental pollution. As a result, a commercially useful water dispersion or solution is highly desirable.

Therefore, it is an object of this invention to provide a resin formed by aqueous emulsion polymerization which can be conveniently dispersed or dissolved in an aqueous medium to form a suitable coating composition.

In accordance with this invention, a resin, suitable for a water reducible composition, having a Ring and Ball softening point in the range of about 100° C to about 300° C is prepared by the method which comprises free radical aqueous emulsion polymerizing, in an aqueous medium having a pH in the range of about 2 to about 7, free radical organic solution polymerizing a monomer mixture which comprises, based on 100 weight percent of monomers (A) about 60 to about 95, preferably about 70 to about 85, weight percent of at least one hard segment hydrophobic enhancing monomer selected from styrene, α-methyl styrene, acrylonitrile, vinyl toluene, methyl methacrylate, vinyl chloride and vinylidene chloride, (B) about 0 to about 35, preferably about 15 to about 25, weight percent of at least one soft segment hydrophobic enhancing monomer selected from at least one acrylate selected from methyl acrylate, ethyl acrylate, butyl acrylate, 2-ethylhexyl acrylate, laural acrylate, isodecyl methacrylate, butyl methacrylate, isobutyl methacrylate, at least one vinyl ether selected from ethyl, butyl, octyl, decyl and cetyl vinyl ether and/or at least one diene selected from 1,3-butadiene, isoprene and 2,3-dimethyl butadiene, provided that said dienes of monomer part (B) and said monomer part (A) vinyl chloride and vinylidene chloride are not mixed together and copolymerized, and (C) about 3 to 15, preferably about 3 to about 10, weight percent of at least one hydrophilic enhancing organic acid selected from acrylic, methacrylic, fumaric, itaconic and maleic acid.

In further accordance with this invention, a water reducible composition comprises an admixture or solution of 100 parts by weight of said resin with about 50 to about 100 parts by weight of coalescing, preferably water soluble, solvent therefor generally selected from ethylene glycol monomethyl ether, ethylene glycol monoethyl ether, ethylene glycol monobutyl ether, diethylene glycol monobutyl ether, diethylene glycol monoethyl ether acetate, diethylene glycol diethyl ether, ethylene glycol monomethyl ether acetate, methyl ethyl ketone, acetone, methyl propyl ketone and diacetone alcohol and about 5 to about 70 parts by weight of at least one resin-compatible plasticizer characterized by a melting point of about −40° C to about 25° C, boiling point of at least 95° C and solubility parameter of about 8 to about 16.

In further accordance with this invention, a coating composition is provided which is prepared by mixing and reacting sufficient amount of a volatile amine with said water reducible mixture and mixing with water to form a stable dispersion or solution of said composition having a pH of about 8 to about 14, where said amine is selected from primary, secondary and tertiary amines having a melting point in the range of about −40° C to about 25° C and a boiling point in the range of about 50° C to about 150° C.

In further accordance with this invention, a substantially water insoluble coating is provided on a substrate having a thickness in the range of about 1 to about 40, preferably about 1 to about 5 mils prepared by applying said coating composition to a substrate surface and drying the applied coating to remove said water, amine and coalescing solvent.

Although the actual mechanism of the invention is not thoroughly understood, it is believed that the unique result is caused by the formation of a resin having a balance of hydrophobic elements, preferably a particular balance of hard and soft hydrophobic elements, with a minor portion of hydrophilic elements which takes on a resemblance of a polymeric surfactant. Such a surfactant-directed polymer then coacts with a combination of a coalescing solvent for the resin itself and compatible plasticizer. Indeed, the result is a water reducible composition in which the expected amount of coalescing solvent is substantially reduced by the plasticizer. Indeed, this is a most important feature. It has even been found that some typically essentially nonsolvents such as normal mineral oil can be successfully admixed with some of the coactive composition of this invention and the resulting mixture water reduced or having the property of being water reducible.

Another important benefit of the coactive water reducible composition of the resin is that water dispersion or solutions can generally be formed without the normally attendant requirement and problem of substantial amounts of surfactive or emulsifying agents, although such agents can be used, if desired. The problem typically involved with large amounts of such materials is that they generally inhibit physical properties of a coating of the resin unless extra curatives and/or hardeners are used.

The substantial amounts of heretofore required surfactive agents have thus correspondingly typically required addition of hardeners or curatives for the resin, for coating purposes. This is because, upon drying, the coating can contain residual amounts of the surfactant which can degrade both the coating's physical properties and water solubility. Without the hardeners and curatives, such a coating on the outside of a building structure would tend to wash off during the first rainstorm.

Thus, it is a particular feature of this invention that the unique combination of said resin with the required plasticizer facilitates the preparation of a stable dispersion of the resin in water minimal use of coalescing solvent and further enables the preparation of a substantially water insoluble coating of the coalesced resin.

In the practice of this invention, it is required that a major portion of the monomers are required to form a hard segment of a hydrophobic nature from monomers selected from styrene, α-methyl styrene, acrylonitrile, vinyl toluene, methyl methacrylate, vinyl chloride and vinylidene chloride. In further practice of this invention, it is preferred and usually required that a substantial minor portion of the monomers form a relatively soft segment which is also hydrophobic in nature selected from acrylate, vinyl ether and certain diene type monomers. For the so-called soft, hydrophobic segment, generally the butyl acrylate, 2-ethylhexyl acrylate and butyl vinyl ether monomers are preferred.

Only a very minor amount of the hydrophilic enhancing organic acid is required or allowed, preferably about 3 to about 10 weight percent. For hydrophilic enhancing segment, it is generally preferred that the acid is selected from acrylic and methacrylic acids and especially preferred that only a minimal amount is used in order to provide only a minimal amount of carboxylation of the resin itself.

For the preparation of the resin of this invention, it is generally desired that it be produced in an aqueous emulsion medium having a pH in the range of about 2 to about 7. The pH can simply be adjusted with an inorganic base such as a base selected from sodium hydroxide, potassium hydroxide and ammonium hydroxide. Such a polymerization is conducted by well-known means such as with adequate stirring, general reactor and reaction control and usually at a temperature in the range of about 5° C to about 80° C. It is understood that the typical surfactive agents, or emulsifiers, and free radical generating catalysts can be used. The resin is also recovered from the emulsion by generally accepted methods, such as coagulation, evaporation and extrusion to yield a hard, particulate resin.

At this point, it would be expected that in order to provide a suitable coating composition, either a solution of the resin or a typical water emulsion or suspension would have to be prepared. Indeed, if desired, such methods can be used. However, the uniqueness of the discovery yields a resin and a coactive resin composition system which acts somewhat as its own surfactant and is thus more easily water reducible with the inclusion of plasticizer and coalescing solvent, if needed.

In this regard, a film forming, water reducible composition is prepared using a mixture of the resin with suitable coalescing solvent and plasticizer. It is preferred that such coalescing solvent is at least water miscible and even more preferably that it is water soluble. Of the various solvents which can be used, generally the ethylene glycol monobutyl ether, ethylene glycol monoethyl ether, diethylene glycol monomethyl ether, diethylene glycol monoethyl ether and diethylene glycol monobutyl ether are preferred. It should be noted that the solvent and plasticizer can be mixed directly with the resin in its water emulsion or latex without its normal recovery in its dried form, in most instances, if desired. In such an operation, the composite would automatically be in a water reduced form, when sufficient amine is used.

Of the various plasticizers, it is desired that one be selected which is liquid at room temperature such as 25° C and have a sufficiently high boiling point, preferably at least 100° C, and even more preferably, at least 150° C, so that they do not volatilize from the coating composition when applied to a substrate. Indeed, the plasticizer should enhance the water insolubility of a dried coating of the coalesced resin. Further, the plasticizer, or mixture of plasticizers, must be characterized by being compatible with the resin itself. For this characterization, a solubility parameter in the range of about 8 to about 16 is required. Such solubility parameter is of the type described in The Encyclopedia of Polymer Science and Technology, Volume 3, page 854, 1965, John Wiley and Sons, Inc., which is simply determined by the equation $$\delta = (\Sigma F)/V = \Sigma F/MW/d$$

where
$\delta$ = solubility parameter
$\Sigma F$ = sum of the pertinent molar attraction constants of groups determined by Small, P A [J Appl Chem 3, 71, (1953)]
$V$ = Molar volume at 25° C
$MW$ = molecular weight
$d$ = density at 25° C.

Various plasticizers can be used for this purpose. They can, for example, be of the type listed in the Federation Series On Coatings Technology, Unit Twenty-two, entitled "Plasticizers," published April, 1974, so long as they fulfill the melting point, boiling point and compatibility requirements.

Representative of various plasticizers are cyclic plasticizers such as phosphoric acid esters, phthalic anhydride esters and trimellitic acid esters as well as N-cyclohexyl-p-toluene sulfonamide, dibenzyl sebacate, diethylene glycol dibenzoate, di-t-octylphenylether, dipropane diol dibenzoate, N-ethyl-p-toluene sulfonamide, isopropylidenediphenoxypropanol, alkylated naphthalene, polyethylene glycol dibenzoate, o-p-toluene sulfonamide, trimethylpentanediol dibenzoate and trimethylpentanediol monoisobutyrate monobenzoate.

Representative of various acyclic plasticizers are adipic acid esters, azelaic acid esters, citric acid esters, acetylcitric acid esters, myristic acid esters, phosphoric acid esters, ricinoleic acid esters, acetylricinoleic acid esters, sebacic acid esters, stearic acid esters, epoxidized esters, as well as 1,4-butane diol dicaprylate, butoxyethyl pelargonate di[(butoxyethoxy)ethoxy] methane, dibutyl tartrate, diethylene glycol dipelargonate, diisooctyl diglycolate, isodecyl nonanoate, tetraethylene glycol di(2-ethylbutyrate), triethylene glycol di(2-ethylhexanoate), triethylene glycol dipelargonate and 2,24-trimethyl-1,3-pentane diol diisobutyrate.

Additional various plasticizers, cyclic, acyclic, and otherwise, include chlorinated paraffins, hydrogenated terphenyls, substituted phenols, propylene glycols, polypropylene glycol esters, polyethylene glycol esters, melamines, epoxidized soya oils, melamines, liquid, hydrogenated abietate esters, epoxytallate esters, alkyl phthalyl alkyl glycolates, sulfonamides, sebacate esters, aromatic epoxies, aliphatic epoxies, liquid poly(α-methyl styrene), maleate esters, mellitate esters, benzoates, benzyl esters, tartrates, succinates, isophthalates, orthophthalates, butyrates, fumarates, glutarates, dicaprylates, dibenzoates and dibenzyl esters. It is to be appreciated that relatively low molecular weight polymers and copolymers derived from monoolefins containing 4 to 6 carbon atoms, mixtures of diolefins and monoolefins containing 4 to 6 carbon atoms as well as such hydrocarbons and hydrocarbon mixtures with styrene and/or α-methyl styrene can also be used.

The preferred esters are prepared from the reaction of carboxylic and dicarboxylic acids including fatty acids, such as the phthalic acids, benzoic acid, dibenzoic acid, adipic acid, sebacic acid, stearic acid, maleic acid, tartaric acid, succinic acid, butyric acid, fumaric acid and glutaric acid with hydrocarbon diols, preferably saturated hydrocarbon diols, having about 7 to 13 carbon atoms.

Representative of various phosphoric acid esters are cresyl diphenyl phosphate, tricresyl phosphate, dibutyl phenyl phosphate, diphenyl octyl phosphate, methyl diphenyl phosphate, tributyl phosphate, triphenyl phosphate, tri(2-butoxyethyl) phosphate, tri(2-chloroethyl) phosphate, tri-2(chloropropyl) phosphate and trioctyl phosphate.

Representative of various phthalic anhydride esters are butyl octyl phthalate, butyl 2-ethylhexyl phthalate, butyl n-octyl phthalate, dibutyl phthalate, diethyl phthalate, diisodecyl phthalate, dimethyl phthalate dioctyl phthalates, di(2-ethylhexyl) phthalate, diiso-octyl phthalate, di-tridecyl phthalate, n-hexyl n-decyl phthalate, n-octyl n-decyl phthalate, alkyl benzyl phthalate, bis (4-methyl-1,2-pentyl) phthalate, butyl benzyl phthalate, butyl cyclohexyl phthalate, di(2-butoxyethyl) phthalate, dicyclohexyl isodecyl phthalate, dicyclohexyl phthalate, diethyl isophthalate, di n-heptyl phthalate, dihexyl phthalate, diisononyl phthalate, di(2-methoxyethyl) phthalate, dimethyl isophthalate, dinonyl phthalate, dioctyl phthalates, dicapryl phthalate, di(2-ethylhexyl) isophthalate, mixed dioctyl phthalates, diphenyl phthalate, 2-(ethylhexyl) isobutyl phthalate, butyl phthalyl butyl glycolate, ethyl (and methyl) phthalyl ethyl glycolate, polypropylene glycol bis(amyl) phthalate, hexyl isodecyl phthalate, isodecyl tridecyl phthalate and iso-octyl isodecyl phthalate.

Representative of trimellitic acid esters are triisooctyl trimellitate, tri-n-octyl n-decyl trimellitate, trioctyl trimellitate, tri(2-ethylhexyl) trimellitate, tri-n-hexyl n-decyl trimellitate, tri-n-hexyl trimellitate, triisodecyl trimellitate and triisononyl trimellitate.

Representative of various adipic acid esters are di[2-(2-butoxyethoxy) ethyl] adipate, di(2-ethylhexyl) adipate, diisodecyl adipate, dioctyl adipates (including diisooctyl adipate) n-hexyl n-decyl adipate, n-octyl n-decyl adipate, and di-n-heptyl adipate.

Representative examples of sebacic acid esters are dibutyl sebacate, di(2-ethylhexyl) sebacate, dibutoxyethyl sebacate, diiso-octyl sebacate and diisopropyl sebacate.

Representative examples of azelaic acid esters are di(2-ethylhexyl) acelate, dicyclohexyl azelate, diisobutyl azelate and diiso-octyl azelate.

In the practice of this invention, the water reducible composition of resin, plasticizer and coalescing solvent, if used, is water reduced by neutralizing the carboxyl groups of the resin with a suitable amine and mixing with water. The resulting dispersion or solution can generally be characterized by being stable without appreciable, if any, precipitation of the resin for a period of at least 30 days and preferably for a period of at least 365 days or more at about 25° C.

Various, relatively volatile, amines can be used for the purpose of reacting with the carboxyl groups of the prepared resin. Representative of various primary amines are ethyl amine, propyl amine, butyl amine, isoamyl amine, amyl amine, hexyl amine, heptyl amine and ethanol amine. Representative of various secondary amines are diethyl amine and ethyl ethanol amine and morpholine. Representative of various tertiary amines are dimethylethanol amine, dimethyl amine and 2-methyl-1-aminopropanol and N-methyl morpholine.

Generally, for the purpose of this invention about 100 to about 400 parts by weight water are used per 100 parts by weight neutralized resin, although more or less water can usually be used depending on whether a high or low viscosity dispersion or solution is desired or whether a high or low solids content is desired. It also depends on the type and amount of coalescing solvent and plasticizer used. The water reduced coating composition, as an aqueous dispersion or solution, is applied as a coating onto a suitable substrate surface such as wood, masonry, various plastics and various metals. The water, amine and coalescing solvent are evaporated from the coating, usually at a temperature in the range of about 20° C to about 100° C, preferably about 25° C to about 50° C, to leave a substantially water insoluble coating of the coalesced resin and plasticizer. Generally such a coating can be prepared and applied without the need for additional hardening agents or curatives to decrease the water sensitivity.

Therefore, it is an important feature of this invention that a durable coating is formed on a substrate through the preparation of a particular resin having balanced hydrophilic and hydrophobic elements, preferably with a further balance of hard and soft segments, and the formation of a water reduced composition of such resin with a combination of coalescing solvent and compatible plasticizer.

The practice of the invention is more fully illustrated by reference to the following examples which are intended to be illustrative rather than limiting of the scope of the invention. All parts are by weight unless otherwise indicated.

EXAMPLE I

Various resins suitable for preparing water reducible compositions were prepared by the following method and labeled herein as Experiments A–G.

To a reactor was charged water, suitable emulsifiers, free radical-generating catalyst and sufficient amount of ammonium hydroxide with potassium pyrophosphate to achieve a pH of about 3.1 to about 6. The mixture was adjusted to a temperature of about 30° C. With stirring, monomers were added to the mixture and allowed to polymerize at a temperature of about 45° C for about 8 hours. The resulting latex was then coagulated and dried to form a particulate resin having a Ring and Ball softening point within a range of about 100° C to about 300° C. The Ring and Ball softening point is of the type determinable by ASTM Method E28-58T.

In this example, various monomer mixtures were used which are summarized in the following Table 1. The columns A–G represent Experiments A–G with their corresponding amounts of monomers in parts by weight.

TABLE I

| Monomers | A | B | C | D | E | F | G |
|---|---|---|---|---|---|---|---|
| A. Hard segment | | | | | | | |
| styrene | 55 | 56 | 45 | 45 | 65 | 65 | 70 |
| α-methyl styrene | 14 | — | — | — | — | — | — |
| acrylonitrile | — | — | 25 | — | — | — | — |
| vinyl toluene | — | — | — | 25 | — | — | — |
| methyl methacrylate | — | 15 | — | — | — | — | — |
| B. Soft segment | | | | | | | |
| 2-ethylhexyl acrylate | 25 | — | — | — | — | 20 | — |
| butyl acrylate | — | 25 | — | 25 | 25 | — | 25 |
| ethyl acrylate | — | — | 25 | — | — | — | — |
| C. Hydrophilic enhancing monomer | | | | | | | |
| acrylic acid | — | — | — | — | 10 | 15 | — |
| methacrylate acid | 6 | 4 | 5 | 5 | — | — | 5 |

EXAMPLE II

Film forming water reducible coating compositions were prepared by mixing 100 parts of several of the various resins produced according to Example I with 60 parts coalescing solvent and 60 parts of various individual plasticizers. Generally the coalescing solvent could be varied in the range of about 60–85 parts and the plasticizer could be varied in the range of about 10–100 parts, depending somewhat on the amount of coalescing solvent used.

For the purpose of this example, the experiments here are labeled on an overall basis as AA–GG to correspond with the resins A–G produced in Example I and demonstrated in Table 2. The plasticizers are represented in Tabular form and numbered 1–15. Thus, Table 2 actually represents 7 times 15, or 105, individual experiments. The mixtures were prepared by mixing the materials at various temperatures in the range of about 25° C to about 80° C. Usually, the mixtures were prepared by mixing for a period in the range of about 20 to about 60 minutes.

The tabulation of various coalescing solvents and plasticizers used are more clearly shown in the following Table 2.

TABLE 2

| Coalescing Solvents and Plasticizers | AA | BB | CC | DD | EE | FF | GG |
|---|---|---|---|---|---|---|---|
| A. Coalescing solvents | | | | | | | |
| ethylene glycol monoethyl ether | — | 60 | 60 | — | — | — | — |
| ethylene glycol monobutyl ether | 60 | 00 | 00 | 60 | 60 | 60 | 60 |
| B. Plasticizers | | | | | | | |
| 1. chlorinated paraffin (50% chlorine) | 60 | 60 | 60 | 60 | 60 | 60 | 60 |
| 2. hydrogenated terphenyl | 60 | 60 | 60 | 60 | 60 | 60 | 60 |
| 3. tributoxyethyl phosphate | 60 | 60 | 60 | 60 | 60 | 60 | 60 |
| 4. styrenated phenol | 60 | 60 | 60 | 60 | 60 | 60 | 60 |
| 5. polypropylene glycol dibenzoate | 60 | 60 | 60 | 60 | 60 | 60 | 60 |
| 6. tricresyl phosphate | 60 | 60 | 60 | 60 | 60 | 60 | 60 |
| 7. diisooctyl adipate | 60 | 60 | 60 | 60 | 60 | 60 | 60 |
| 8. butyl phthalyl butyl glycolate | 60 | 60 | 60 | 60 | 60 | 60 | 60 |
| 9. N-ethyl toluene sulfonamides (mixed isomers) | 60 | 60 | 60 | 60 | 60 | 60 | 60 |
| 10. diisooctyl sebacate | 60 | 60 | 60 | 60 | 60 | 60 | 60 |
| 11. diisodecyl phthalate | 60 | 60 | 60 | 60 | 60 | 60 | 60 |
| 12. triisodecyl mellitate | 60 | 60 | 60 | 60 | 60 | 60 | 60 |
| 13. dipropyleneglycol dibenzoate | 60 | 60 | 60 | 60 | 60 | 60 | 60 |
| 14. diisooctyl azelate | 60 | 60 | 60 | 60 | 60 | 60 | 60 |
| 15. tri-2-ethylhexyl citrate | 60 | 60 | 60 | 60 | 60 | 60 | 60 |

EXAMPLE III

Various water reduced coating compositions were prepared by simply mixing various coating compositions with water, after sufficient dimethyl ethanol amine was added, to achieve a pH of the resulting water dispersion or solution in the range of about 8 to about 14. The water reduced compositions were formed by mixing about 330 parts water with the amine neutralized compositions of Experiments AA to GG at a temperature in the range of about 25° C to about 80° C for a period of about 20 to about 60 minutes. Stable dispersions or solutions were formed which were stable for a period of at least 30 days at about 25° C.

Coatings of water reduced compositions AA to GG were formed on substrates selected from glass, aluminum and steel having thicknesses in the range of about 1 to about 3 mils which, upon drying to remove water, coalescing solvent and amine, were essentially impervious to water. The films were formed by applying the coatings to the substrate and drying them at a temperature in the range of about 20° C to about 80° C for about 8 to about 24 hours.

EXAMPLE IV

The utilization of plasticizers in this invention have uniquely made it possible to use solvents which are not generally considered true solvents for the resin itself. Representative of such typically non solvents are low aromatic mineral spirits containing a maximum of about 20 volume percent aromatic content.

Exemplary of a water reduced clear coating composition utilizing a non-solvent is one prepared by mixing 100 parts of resin G, 70 parts chlorinated paraffin (50% chlorine) plasticizer and 60 parts mineral spirits. After mixing at a temperature of about 75° C the mixture was neutralized with 5 parts of dimethyl ethanol amine. To the neutralized composition was mixed 330 parts of water which provided a stable dispersion of the coating composition. It is important to note in this case that mineral spirits by itself is not considered a solvent for the resin used in this example.

EXAMPLE V

A water reduced paint, containing various pigments, fillers and levelers, was prepared from a coating composition of this invention. It was prepared from a pigment dispersion, identified herein as Part A, and a vehicle, identified herein as Part B. The recipe is more clearly shown in the following Table 3.

TABLE 3

| Part A Pigment Dispersion | | Part B Vehicle | |
| --- | --- | --- | --- |
| water | 200 | ethylene glycol | |
| thickener | 10 | monobutyl ether | 68 |
| pigment wetting agent | 5 | pine oil | 1 |
| defoamer | 2 | chlorinated paraffin | 30 |
| chelating agent | 5 | hydrogenated terphenyl | 30 |
| titanium dioxide | 50 | dimethyl ethanol amine | 5 |
| calcium carbonate | 300 | resin G (from Example I) | 100 |
| amorphous silica | 100 | | |
| water (add after pigment mixture is ground) | 130 | | |

The paint preparation was prepared by slowly, with agitation, introducing Part A into Part B until inversion is complete. With agitation, 30 parts of Perlite 68B was slowly added to the mixture. The final paint composition (a high build texture paint) had a pigment volume concentration of 62.5 percent and a solids content of 62.8 percent. The coalescing solvent/water volume ratio was 20/80. This coating was applied to a cement-asbestos substrate at a thickness of 30 mils wet. After 30 minutes, tap water was cascaded down the coated panel at a rate of about 2 gallons per minute for 8 hours. The coating did not soften or wash off.

In these examples, it has been shown how, in the practice of this invention, suitable resins can be prepared, water reducible compositions can be prepared with the resin and how a durable coating can be formed from the water reduced composition.

In the practice of this invention, it should be pointed out that when preparing the resin, the vinyl chloride and vinylidene chloride monomers are not utilized when it is desired to use one of the dienes in the polymerization process. In other words, if it is desired that the resin contain units derived from vinyl chloride and/or vinylidene chloride, then the diene is not used and vice versa.

The examples of this specification have also shown the wide utility of various organic plasticizers suitable for use with the combination of resin, coalescing solvent and water. It should be pointed out that the requirement of the organic plasticizer that it have a boiling point of at least about 95° C generally refers to the plasticizers which boil above 95° C or, if they only reasonably boil under a reduced pressure in order to prevent them from alternatively degrading, then the 95° C requirement is intended to relate to such organic plasticizers which degrade at a temperature greater than 95° C.

In the further description of this invention, it has been pointed out that the basic resin can be prepared by aqueous emulsion polymerization or by organic solvent solution polymerization of the monomers. With regard to the preparation of the resin by solution polymerization, it is to be understood that the polymerization is to be conducted by methods generally known to those having skill in the art. In such polymerizations, generally aromatic solvents such as benzene, toluene and xylene are used, with xylene and toluene being preferred, along with properly selected free radical catalysts which are soluble in the solvents. As it is known, and if desired, some alcohols such as isopropanol as well as other similar alcohols can be mixed with the organic solvent. Furthermore, for the purpose of preparing the resin through solution polymerization, various amounts of the hereinbefore coalescing solvents can also be mixed with the aromatic solvents. When a coalescing solvent is used for this purpose, generally the overall solvent contains about 15 to about 25 or 30 weight percent of such coalescing solvent.

While certain representative embodiments and details have been shown for the purpose of illustrating this invention, it will be apparent to those having skill in this art that certain changes and modifications may be made therein without departing from the spirit or scope of the invention.

What is claimed is:

1. A coating composition which comprises an aqueous dispersion or solution prepared by (i) mixing and reacting sufficient amount of a volatile amine with a water reducible composition comprised of an admixture or solution of (a) a solid, particulate resin, (b) coalescing solvent and (c) plasticizer and (ii) mixing sufficient water therewith to form a stable dispersion or solution of said composition having a pH in the range of about 8 to about 14, where said water reducible composition comprises an admixture or solution of 100 parts of the solid resin with about 50 to about 100 parts by weight of a coalescing solvent therefor comprising at least one solvent selected from ethylene glycol monomethyl ether, ethylene glycol monoethyl ether, ethylene glycol monobutyl ether, diethylene glycol monobutyl ether, diethylene glycol monoethyl ether acetate, diethylene glycol diethyl ether, ethylene glycol monomethyl ether acetate, methyl ethyl ketone, acetone, methyl propyl ketone and diacetone alcohol and about 5 to about 70 parts by weight of at least one compatible plasticizer characterized by having a melting point of about −40° C. to about 25° C., a boiling point of at least 95° C. and a solubility parameter of about 8 to about 16, where said resin has a Ring and Ball softening point in the range of about 100° C. to about 300° C. and is prepared by the method which comprises (A) free radical aqueous emulsion polymerizing, in an aqueous medium having a pH in the range of about 2 to about 7, or free radical organic solution polymerizing a monomer mixture which comprises, based on 100 weight percent of monomers A. about 70 to about 85 weight percent of at least one hard segment hydrophobic enhancing monomer selected from styrene, α-methyl styrene, acrylonitrile, vinyl toluene, methyl methacrylate, vinyl chloride and vinylidene chloride, B. about 15 to about 25 weight percent of at least one soft segment hydrophobic enhancing monomer selected from at least one acrylate selected from methyl acrylate, ethyl acrylate, butyl acrylate, 2-ethylhexyl acrylate, laural acrylate, isodecyl methacrylate, butyl methacrylate, isobutyl methacrylate, at least one vinyl ether selected from ethyl, butyl, octyl, decyl, and cetyl vinyl ether and/or at least one diene selected from 1,3-butadiene, isoprene and 2,3-dimethyl butadiene, provided that said dienes of monomer part (B) and said monomer part (A) vinyl chloride and vinylidene chloride are not mixed together and copolymerized, and C. about 3 to 10 weight percent of at least one hydrophilic enhancing organic acid selected from acrylic, methacrylic, fumaric, itaconic and maleic acid, and (B) recovering said resin from the emulsion as a hard, particulate, resin and where said volatile amine is selected from primary, secondary and tertiary amines having a melting point in the range of about −40° C. to about 25° C. and a boiling point in the range of about 50° C. to about 150° C.

2. The coating composition of claim 1 wherein said resin is prepared by free radical emulsion polymerizing a monomer mixture which comprises
   A. about 70 to about 85 weight percent of at least one hard segment hydrophobic enhancing monomer selected from styrene, α-methyl styrene, acrylonitrile, vinyl toluene and methyl methacrylate,
   B. about 15 to about 25 weight percent of at least one soft segment hydrophobic enhancing monomer selected from at least one acrylate selected from methyl acrylate, ethyl acrylate, butyl acrylate, 2-ethylhexyl acrylate, laural acrylate, isodecyl methacrylate, butyl methacrylate and isobutyl methacrylate and
   C. about 3 to about 10 weight percent of at least one hydrophilic enhancing organic acid selected from acrylic and methacrylic acid,
and where said coalescing solvent comprises a water soluble solvent selected from at least one of ethylene glycol monobutyl ether, ethylene glycol monoethyl ether, ethylene glycol monomethyl ether and diethylene glycol monobutyl ether.

3. The coating composition of claim 1 containing about 200 to about 400 parts water per 100 parts resin.

4. The coating composition of claim 1 where said diamines are selected from ethyl amine, propyl amine, butyl amine, isoamyl amine, amyl amine, hexyl amine, heptyl amine, ethanol amine, diethyl amine, ethyl ethanol amine, morpholine, dimethylethanol amine, dimethyl amine, 2-methyl-1-aminopropanol and N-methyl morpholine.

5. A substantially water insoluble coating having a thickness in the range of about 1 to about 40 mils adhered to a substrate prepared by applying said coating composition of claim 1 to a substrate surface and drying the applied coating to remove said water, volatile amine and coalescing solvent.

6. The coating composition of claim 5 prepared by applying and drying a coating composition, said coating composition prepared by mixing and reacting sufficient amount of said volatile amine with said water reducible composition and mixing sufficient water therewith to form the stable dispersion or solution, where said water reducible composition is prepared from said plasticizer and a water soluble coalescing solvent selected from at least one of ethylene glycol monobutyl ether, ethylene glycol monoethyl ether, ethylene glycol monomethyl ether and diethylene glycol monobutyl ether, and a resin prepared by free radical emulsion polymerizing a monomer mixture which comprises
   A. about 70 to about 85 weight percent of at least one hard segment hydrophobic enhancing monomer selected from styrene, α-methyl styrene, acrylonitrile, vinyl toluene and methyl methacrylate,
   B. about 15 to about 25 weight percent of at least one soft segment hydrophobic enhancing monomer selected from at least one acrylate selected from methyl acrylate, ethyl acrylate, butyl acrylate, 2-ethylhexyl acrylate, laural acrylate, isodecyl methacrylate, butyl methacrylate and isobutyl methacrylate, and
   C. about 3 to about 10 weight percent of at least one hydrophilic enhancing organic acid selected from acrylic and methacrylic acid.

7. The coating composition of claim 1 where said water reducible composition contains mineral oil which has a maximum of about 20 volume percent aromaticity.

* * * * *